UNITED STATES PATENT OFFICE.

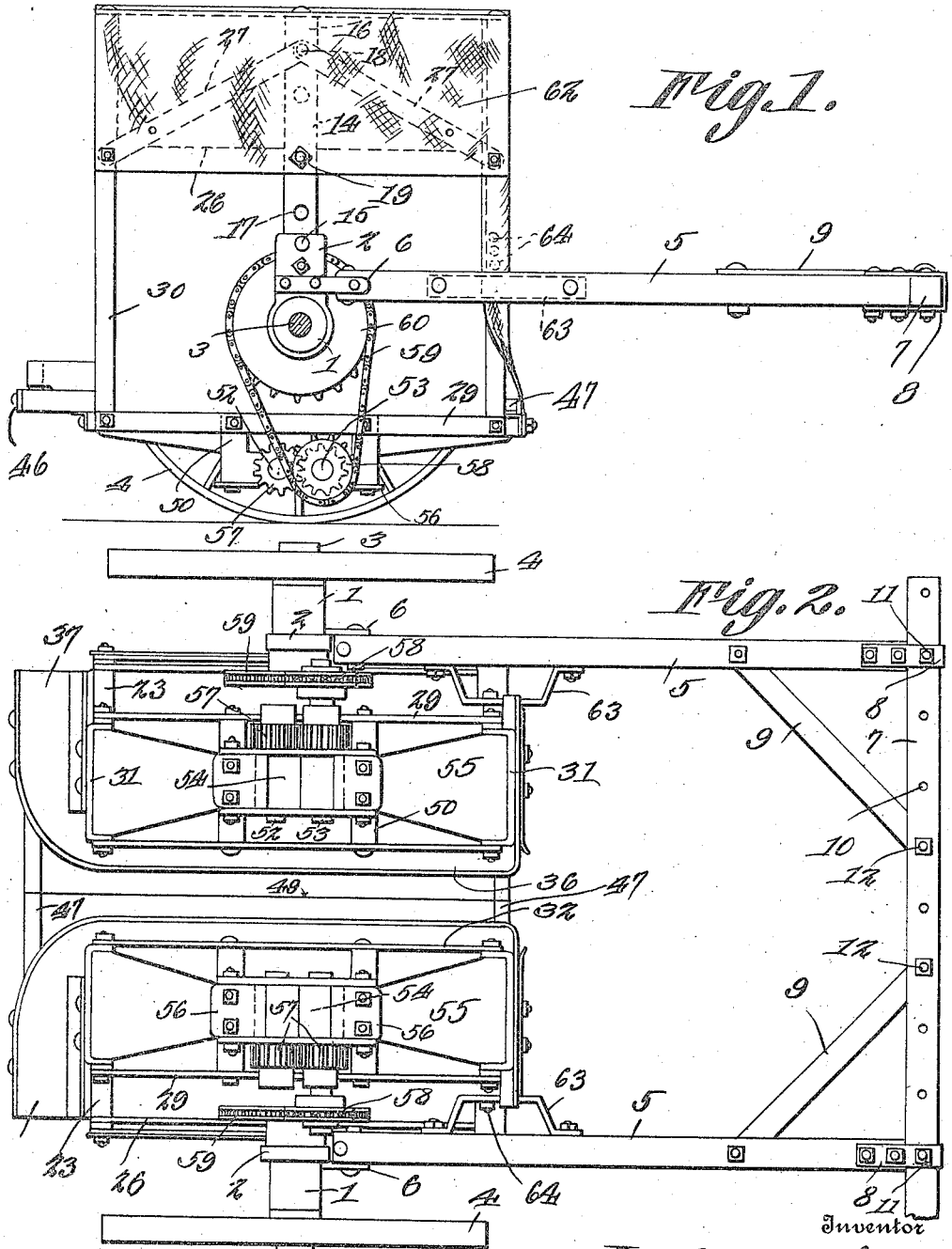

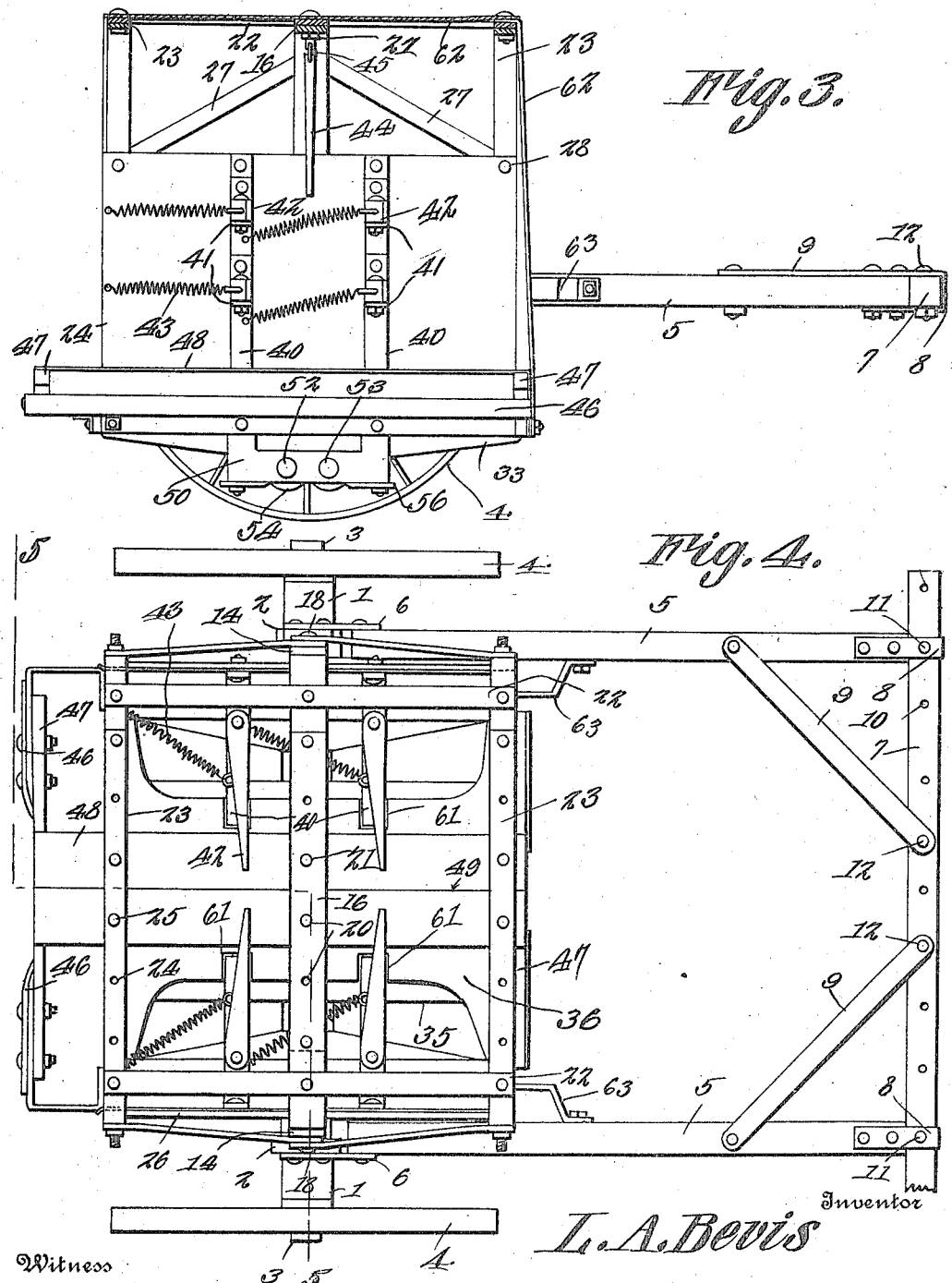

LONNIE ANDERSON BEVIS, OF ROANOKE, ALABAMA.

BOLL-WEEVIL EXTERMINATOR.

1,254,649.  Specification of Letters Patent.  Patented Jan. 29, 1918.

Application filed May 15, 1917. Serial No. 168,757.

*To all whom it may concern:*

Be it known that I, LONNIE A. BEVIS, a citizen of the United States, residing at Roanoke, in the county of Randolph and State of Alabama, have invented a new and useful Boll-Weevil Exterminator, of which the following as a specification.

The device forming the subject matter of this application is adapted to be employed for collecting and destroying boll weevils, and for the purpose of collecting the punctured squares.

The invention aims to provide novel means for collecting the weevils and the squares, to provide novel means for crushing the weevils and the squares, and to provide novel means whereby the weevils and the squares are conveyed to the crushing means.

Another object of the invention is to provide novel means for agitating the plants.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a boll weevil exterminator constructed in accordance with the present invention, one of the ground wheels being removed;

Fig. 2 is a bottom plan of the boll weevil exterminator forming the subject matter of this application;

Figure 5:
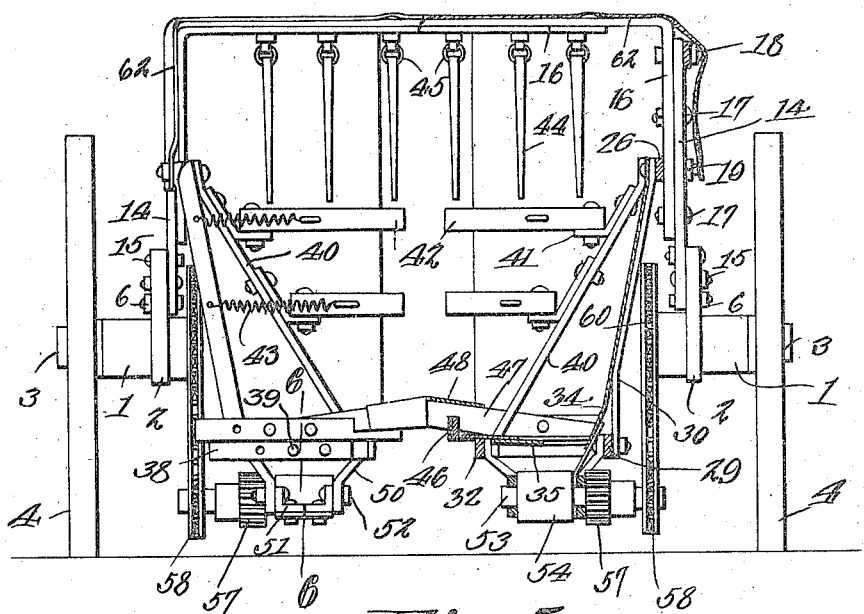

Fig. 3 is a vertical longitudinal section of a boll weevil exterminator embodying the present improvements;

Fig. 4 is a top plan of the boll weevil exterminator, the hood being removed;

Fig. 5 is a cross section taken approximately on the line 5—5 of Fig. 4; and

Figure 6:
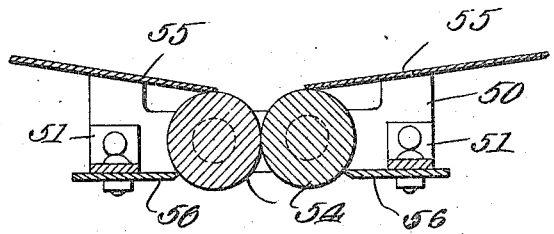

Fig. 6 is a fragmental section taken in a vertical plane, approximately on the line 6—6 of Fig. 5.

In carrying out the present invention there is provided a pair of bearings 1 having upstanding vertical extensions 2. Axles 3 are journaled for rotation in the bearings 1 and carry ground wheels 4. With the extensions 2 of the bearings 1 is connected a forwardly presented handle including side bars 5 united with the extensions 2 by means of tie strips 6. The handle includes an end bar 7 mounted for endwise adjustment in yokes 8 carried by the forward ends of the side bars 5 of the handle. Braces 9 are connected at their rear ends, pivotally, with side bars 5 of the handle. The end bar 7 of the handle has holes 10, spaced apart longitudinally of the bar. Securing elements 11 pass through the yokes 8 and are adapted to be engaged in the holes 11 of the end bar 7. Securing elements 12 connect the forward ends of the braces 9 with the end bar 7 of the handle, and are adapted to be mounted adjustably in the holes 10. Owing to the construction above described, the side bars 5 may be adjusted toward and away from each other, longitudinally of the end bar 7 of the handle. This construction is of use when it is desired to move the bearings 1 and consequently the ground wheels 4 toward and away from each other, thereby to broaden or to narrow the wheel tread of the machine, and to adjust with respect to each other, transversely of the line of advance of the machine, the instrumentalities whereby the boll weevils and punctured squares are collected and crushed.

Upright standards 14 are attached as shown at 15 to the extensions 2 of the bearings 1. The numeral 16 denotes a pair of intermediate, L-shaped frame members. The vertical, depending portions of the frame members 16 are attached by securing elements 17, 18 and 19 with the standards 14, for vertical adjustment, in order that the machine may be adapted to accommodate standing plants of different heights. The horizontal upper portions of the frame members 16 are overlapped on each other and are provided with holes 20 adapted to receive securing devices 21, the construction being such that, as explained in connection with the handle of the machine, the structure may be broadened or narrowed. Top bars 22, located at the sides of the machine, are united intermediate their ends with the top portions of the frame members 16. L-shaped terminal frame members 23 are united with the ends of the top bars 22. The top parts of the terminal frame members 23 are overlapped on each other, and are provided with holes 24 adapted to receive securing devices 25, in order to permit a lateral expansion and contraction of the machine as aforesaid. Longitudinal strips 26 are held to the standards 14 and to the depending portions of the intermediate frame members 16 by means of the securing devices 19, and the ends of the longitudinal strips 26 are attached to the depending parts of the L-shaped terminal frame members 23. The upper ends of diagonal braces 27 are mounted on the securing elements 18, and the lower ends of the braces 27 are united by securing members 28 with the ends of the longitudinal strips 26, and with the depending portions of the terminal frame members 23.

Hangers 30 depend from the ends of the strips 26, and from the intermediate portions thereof, and are mounted on the securing devices 19 and 28. The hangers 30 support horizontal loop-shaped frames including outer bars 29, inner bars 32, and end strips 31 connecting the inner and outer bars. Supported on the loop-shaped frames above described and secured thereto are hoppers 33. Side plates 34 are connected with the longitudinal strips 26 and are supported laterally by the hangers 30, the side plates extending downwardly into the hoppers 33 and coöperating with the outer walls thereof. The hoppers 33 include tops 35 spaced from the side plates 34. Supported on the inner bars 32 and the end strips 31 of the loop-shaped frames above described, are pans 36 provided at their rear ends with outwardly prolonged extensions 37. Assembled with the bottoms of the pans 36 are brackets 38 united by securing elements 39 with the end strips 31 of the loop-shaped frames, the construction being such that the pans may be adjusted inwardly and outwardly, transversely of the line of advance of the vehicle. The upper ends of downwardly and inwardly inclined braces 40 are connected with the longitudinal strips 26, the lower ends of the braces being united with the inner bars 32. The braces 40 pass through the bottoms of the pans 36, and the bottoms of the pans are provided with slots 61, permitting a lateral adjustment of the pans on the tops 35 of the hoppers 33, as aforesaid. Projecting inwardly from the braces 40 are horizontal supports 41 on which are mounted to swing, in horizontal planes, beaters 42, controlled by springs 43 assembled with any accessible portions of the framework of the machine. Depending beaters 44 are pivoted as indicated at 45 to the overlapped top portions of the intermediate frame members 16. Extended along the inner flanges of the pans 36 and secured thereto are protecting strips 46.

Spring arms 47 are attached to the forward and rear ends of the pans 36, and extended between the inner ends of the spring arms 47 of each pan is a flexible strip 48, preferably made of canvas, the strips being disposed flush with the upper edges of the pans. The coöperating inner edges of the strips 48 are designated by the numeral 49. The spring arms 47 preferably are made of rubber, although some material other than rubber may be employed in the making of the spring arms, if desired.

Fixed to and depending from the bars 29 and 32, and extended longitudinally of the machine, are hangers 50, held apart by spacers 51. Shafts 52 and 53, disposed horizontally, are journaled for rotation in the hangers 50. The shafts 52 and 53 carry coacting crushing rolls 54. The bottom portions 55 of the hoppers 33 are disposed closely adjacent to the upper portions of the crushing rolls 54 as clearly shown in Fig. 6. The spacers 51 carry guards 56 coacting with the peripheries of the crushing rolls 54 adjacent the lower portions of the rolls. Fixed to each shaft 53 is a sprocket wheel 58, about which is trained a sprocket chain 59, the sprocket chains 59 being engaged around the sprocket wheels 60 carried by the axles 3. The shafts 52 and 53 are operatively connected by means of gear wheels 57.

A hood 62 may be assembled with the forward, the upper and the side portions of the upstanding framework of the machine. Brackets 63 are connected with the side bars 5 of the handle, and are connected adjustably as indicated at 64 with the forward hangers 30, so as to permit a raising and lowering of the forward end of the handle 5—7.

In practical operation, as the machine is drawn forwardly over the ground, the standing plants come into contact with the forward spring arms 47, and the same swing rearwardly, to a slight extent, permitting standing plants to pass between the edges 49 of the flexible strips 48. As soon as the standing plants are free of the forward spring arms 47, the strips 48 are tightened up. As a consequence, the standing plants are closely engaged between the coöperating edges 49 of the strips 48. Further, when the strips 48 are tightened up, by the action of the spring arms 47, as aforesaid, the standing plants are given a later thrust or jerk which aids in detaching the punctured squares and the boll weevils from the plants, although it is to be understood that the punctured squares and the boll weevils are detached primarily by the spring controlled beaters 42 and by the depending beaters 44.

The boll weevils and the punctured squares, having been received on the strips 48 are directed into the pans 36, and from the pans 36, the boll weevils and the punctured squares are deposited in the hoppers 33, the material above mentioned passing from the bottoms 55 of the hoppers, between the crushing rolls 54, the boll weevils being destroyed in this way. The crushing rolls 54 are operated, as will be understood readily, by gear trains comprising the intermeshing wheels 57, the sprocket wheels 58, the chains 59, the sprocket wheels 60, and the axes 3 which are driven by the ground wheels 4.

The machine may be broadened or contracted horizontally, as hereinbefore stated, owing to the fact that the frame members 16 are overlapped in their inner portions, and connected adjustably, and owing to the fact that the frame members 23 are overlapped and adjustably connected. Further, as hereinbefore mentioned, since the standards 14 are adjustably attached as shown at 15 to the extension 2 of the bearings 5, the pans 36 and the hoppers 33 may be adjusted vertically, the same being carried by the loop-shaped frames including the inner bars 32, the outer bars 29 and the end strips 31, these frames being assembled with the longitudinal strips 26 by means of the hangers 30.

Having thus described the invention, what is claimed is:—

1. In a boll weevil exterminator, a wheel-mounted frame; pans carried thereby; flexible strips extended longitudinally of the frame and coacting with the inner edges of the pans; and spring arms carried by the pans and supporting the strips, certain of the spring arms lying in the path of the standing plants, whereby the said spring arms will be plant-actuated to loosen the strips, thereby permitting a passage of the plants between the strips, the spring arms constituting means for tightening the strips whereby to impart a lateral movement to the plants.

2. In a boll weevil exterminator, a wheel-mounted support; hangers and braces depending from the support at the sides thereof; frames attached at their outer sides to the hangers and attached at their inner sides to the braces; hoppers carried by the frames; pans discharging into the hoppers and supported on the frames for adjustment transversely of the line of advance of the exterminator, the bottoms of the pans having slots receiving the braces to permit a transverse adjustment of the pans and to guide the pans when the same are adjusted transversely; and crushing means whereinto the hoppers discharge.

3. In a boll-weevil exterminator, a carrying frame; pans supported thereby; and transversely-flexible longitudinally-tensioned strips extended longitudinally of the frame and coacting with the inner edges of the pans, the longitudinal edges of the strips being free, the strips being adapted to be flexed laterally by the plants and being constructed to straighten, due to the tensioning of the strips, thereby to impart a lateral shaking movement to the plants.

4. In a boll weevil exterminator, a wheel-mounted frame including a top and sides; depending beaters having their upper ends pivoted to the top of the frame; substantially horizontal beaters located in front of and to the rear of the depending beaters and having their outer ends pivoted to the sides of the frame; and spring means operatively connected with the last specified beaters for controlling the movements thereof.

In testimony that I claim the foregoing as my own, I have hereto affixed my signature in the presence of two witnesses.

LONNIE ANDERSON BEVIS.

Witnesses:
T. M. SWANN,
A. W. AWBREY.

Copies of this patent may be obtained for five cents each, by addressing the "Commissioner of Patents, Washington, D. C."